United States Patent [19]

Fujisawa et al.

[11] Patent Number: 5,350,617
[45] Date of Patent: Sep. 27, 1994

[54] WATER SHIELDABLE MATERIAL AND CABLE USING THE SAME

[76] Inventors: Noriaki Fujisawa, 488-53, Kominami-cho, Yamatokoriyama-shi, Nara 639-11; Yasuro Sakai, 11-2-411, Kitayanagawa-cho, Takatsuki-shi, Osaka 569; Tsuneo Kuwabara, 94, Nagasawa, Yokosuka-shi, Kanagawa 239; Shigezou Kukita, 510, Tsukui, Yokosuka-shi, Kanagawa 239, all of Japan

[21] Appl. No.: 955,871
[22] PCT Filed: Feb. 8, 1991
[86] PCT No.: PCT/JP91/00156
§ 371 Date: Dec. 7, 1992
§ 102(e) Date: Dec. 7, 1992
[87] PCT Pub. No.: WO92/13715
PCT Pub. Date: Aug. 20, 1992

[51] Int. Cl.⁵ .................... B32B 25/10; B32B 20/00
[52] U.S. Cl. .................... 428/141; 428/143; 428/147; 428/221; 428/245; 428/332; 428/340; 428/391; 385/100; 385/109; 385/115
[58] Field of Search ............... 428/373, 141, 143, 147, 428/221, 245, 332, 340, 391; 385/100, 109, 115

[56] References Cited

U.S. PATENT DOCUMENTS 4,802,732  2/1989  Fukuma et al. .................. 350/96.23

FOREIGN PATENT DOCUMENTS 0188959  7/1986  European Pat. Off. .
343357  12/1989  Japan .

OTHER PUBLICATIONS

Derwent Publications Ltd., London, GB; AN 90-380880 (51) & JP-A-2 276 840 (Tokai Rubber Ind KK) Nov. 13, 1990.
Derwent Publications Ltd., London GB; AN 89-321387 (44) & JP-A-1 240 547 (Nippon Teleg. & Teleph. KK) Sep. 26, 1989.
Communication dated Apr. 7, 1993 from the European Patent Office in Application 919 032 82.1; Supplementary European Search Report and Annex.

Primary Examiner—Patrick J. Ryan
Assistant Examiner—Richard C. Weisberger
Attorney, Agent, or Firm—Finnegan, Henderson, Farabow, Garrett & Dunner

[57] ABSTRACT

A water shieldable material comprising a coating layer (2) having a specific density and comprising a specific rubber binder having non-watersolubility and flexibility and a high water absorption polymer particle (4) having a specific diameter and a solid substrate (3) supporting the coating layer, and at least satisfying the following conditions.

1. The density of the coating layer is between 0.65 g/cm$^3$ and 1.00 g/cm$^3$.
2. The weight ratio of the high water absorption polymer particle and the rubber group binder in the main portion, i.e., 90% or more by weight of the coating layer, is between 50% by weight and 90% by weight for the high water absorption polymer particle and between 10% by weight and 50% by weight.
3. The diameter of the particles belonging to the weight ratio of between 55% by weight and 95% by weight in the high water absorption polymer particle is between 45 μm and 425 μm.

9 Claims, 7 Drawing Sheets

WATER SHIELDABLE MATERIAL AND CABLE USING THE SAME

TECHNICAL FIELD

The present invention relates to a water shieldable material having superior water shieldability. More particularly, the present invention relates to a water shieldable material having superior water shieldability for water having a lower ionicity as well as water having a high ionicity such as a sea-water, for which it is generally difficult to attain superior water shieldability, and is capable of effectively being used as a water shielding tape for a hold winding layer of, in particular, an electrical wire cable or an optical fiber cable. The present invention relates further to a cable using the water shielding material.

PRIOR ART

In recent years, cables such as optical fiber cables embedded in the ground have frequently been used. Accordingly, characteristics required as a filler, such as, covering buffer properties preventing the core of a communication cable from external force, an easy filling ability depending on workability when manufacturing the cable or the like are required of the cable, and in addition to superior water shieldability. The water shieldability is a property of absorbing rapidly water flowing in a longitudinal direction of the cable and shielding the water by a swell thereof, when a jacket of the cable is broken and the water flows into the cable.

The T-letter method and L-letter method have been used as methods of testing the water shieldability. The T-letter method is a method of testing water flowing in the longitudinal direction when an external force is applied to the jacket of the cable and water flows through holes or crocks generated by the external force into the cable. The L-letter method is a method of testing water flowing in the longitudinal direction from a cross section of the cable cut by an external force. In both methods, the water shieldability is evaluated by a length expressed in mm and after the water has flowed into the cable for 24 hours. When the value representing the length is small, it is determined that the cable has superior water shieldability, and it is required that the cable has superior value of the water shieldability in the T-letter method and the L-letter method.

Japanese Unexamined Patent Publication (Kokai) No. 63-6055 discloses a composite material having a water swelling ability and comprised of a substrate of a polyvinylpyrrolidine group binder, a dried film of which has water-solubility and a water-soluble polymer coated on the substrate. This composite material, however, cannot be practically used because, since the binder is water-soluble, the water-shieldable tape curls when there is a change in humidity due to dimensional changes caused by the substrate and the coating layer absorbing moisture, and the tape becomes sticky when absorbing moisture. Further this composite material has inferior workability when manufacturing and applying the cable because of the high level of hardness of the film thereof.

Japanese Unexamined Patent Publication (Kokai) No. 1-240547 discloses a water shieldable material obtained by coating a surface of a woven fabric and a nonwoven sheet with a rubber group binder and a high ion water absorption composition. This type water shieldable material made of a water absorption polymer composed of particles having a small diameter has an inferior water shieldability value as measured by the L-letter method because the water absorption polymer does not drop away from the surface of the nonwoven fabric and thus the polymer swells on the surface of the nonwoven fabric, and this type of water shieldable material made of a water absorption polymer composed of particles having a large diameter has an inferior water shieldability value as measured by the T-type method because the density of the coating layer composed of the rubber group binder and the water absorption polymer is small. Accordingly, when, for example, water shielding inside an optical fiber cable takes place using this water shieldable material, it is necessary to wind the water shieldable material on the outside of the cable and in addition, insert a tape-like material, made by cutting the water shieldable material having a narrow width, into a slot i.e. a groove in which a core wire is accommodated.

Japanese Unexamined Patent Publication (Kokai) No. 2-183911 discloses a water shieldable material obtained by coating a surface of a nonwoven sheet through a peeling layer of a material selected from a group of polyethylene and polypropylene with a water swelling resin layer composed of a rubber group binder and a water swelling resin. However, since the diameter of the particles of the water swelling resin in the water swelling resin layer is small, the water swelling resin does not drop away from the resin layer in the water shieldable material, and a water shielding operation is performed by the water swelling resin layer peeled at the peeling layer from the nonwoven fabric. Accordingly, this water shieldable material also has inferior water shieldability as measured by the T-type method and the L-type method.

As previously described, a water shieldable material having superior water shieldability features, in particular water shieldability for a minute gap, a non-curling property for various levels of moisture, a stickproofing property, a covering buffer property, a non-rotting property, easy workability when manufacturing and applying the cable or the like has not yet been devised.

DISCLOSURE OF THE INVENTION

The primary object of the present invention is to solve, the problems of the conventional water shieldable material and to provide a water shieldable material having superior water shieldability features, in particular, water shieldability for a minute gap such as a slot of a photofiber cable, a non-curling property for various moisture levels, a stickproofing property, a covering buffer property, a non-rotting property and cable moldability.

The second object of the present invention is to provide an electric wire cable and a opticalfiber cable made of a water shieldable material in accordance with the present invention.

The water shieldable material in accordance with the present invention comprises a coating layer comprising a rubber binder and a high water absorption polymer particle having a specific diameter, and a solid substrate supporting the coating layer is characterized in that a density of the coating layer is determined to a specific value.

Namely the primary object of the present invention is attained by a water shieldable material comprising a solid substrate and a coating layer arranged on the solid substrate and comprising a high water absorption polymer particle and a rubber group binder, characterized in that the density of the coating layer is between 0.65 g/cm$^3$ and 1.00 g/cm$^3$; the ratio of a total weight of the high water absorption polymer particle and the rubber group binder in the coating layer is 90% by weight or more; the weight ratio between the high water absorption polymer particle and the rubber group binder is determined so that the weight ratio of the high water absorption polymer particle is a value between 50% by weight and 90% by weight and the weight ratio of the rubber group binder is a value between 10% by weight and 50% by weight, and the diameter of the particle belonging to the weight ratio of between 55% by weight and 95% by weight in the high water absorption polymer particle is between 45 μm and 425 μm.

An electric wire cable or an optical fiber cable attaining the second object of the present invention is characterized in that the water shieldable material of the present invention is used as a water shieldable tape for a hold winding.

Since the high water absorption polymer particle is constituted as described herebefore, when the polymer particles are not is contact with water, the polymer particles do not drop away from the solid substrate, and when the polymer particles are in contact with water, the polymer particles swell rapidly and drop away from the solid substrate in the water shielding material in accordance with the present invention. And thus the polymer particles spread separately each other in the cable and can shield the water.

Since the size of the high water absorption polymer particle, the density thereof and the ratio between the high water absorption polymer particle and the rubber group binder in the coating layer are suitably determined, when the water flows therein, the high water absorption polymer particle positioned where the water is flowing swells rapidly, and thus superior water shieldability as measured by the T-letter type method can be attained. Further, the high water absorption polymer particle drop away from a binder and can spread into a slot, and thus superior water shieldability as measured by the L-letter type method, i.e. a property thereby preventing water from advancing can be attained. Further, since the high water absorption polymer particle is fixed on the solid substrate by the rubber group binder in the coating layer, the polymer particle will not drop away when connecting the cable and thus workability is superior, and the water shieldable material in accordance with the present invention has a superior non-curling property for various moisture levels and a superior stickproofing property. Further since a non-aqueous rubber group binder having flexibility is used, a covering buffer property, a non-rotting property and cable molability when manufacturing and connecting the cable can be realized.

BEST MODE FOR CARRYING OUT THE INVENTION

The present invention will be described hereinafter in connection with the accompanying drawings showing an example of a water shieldable material in accordance with the present invention and an example of the optical fiber cable in accordance with the present invention.

Figure 1:
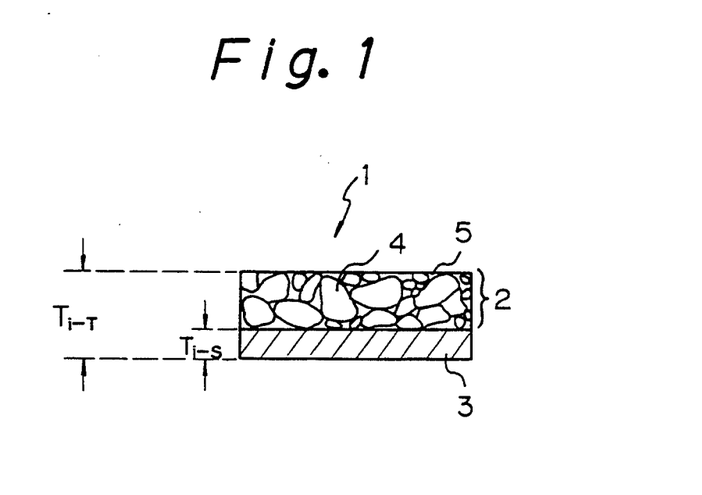
FIG. 1 is an enlarged and schematical cross sectional view of a water shieldable material in accordance with the present invention.

FIG. 1 shows, in model form, an enlarged cross section of the water shieldable material in accordance with the present invention.

As shown in FIG. 1, a water shieldable material 1 in accordance with the present invention comprises a solid substrate 3 and a coating layer 2 arranged on the solid substrate 3 and comprising a plurality of high water absorption polymer particles 4 and a rubber group binder 5. By determining definite values for the diameter of the high water absorption polymer particle, the weight ratio between the high water absorption polymer and the rubber group binder and the density of the coating layer, respectively, when the water shieldable material is in contact with water, the high water absorption polymer swells rapidly and thus drop away from the solid substrate and as a result a water shielding operation can be attained.

In the water shieldable material in accordance with the present invention, first it is required that the diameter of the particle belonging to a weight ratio of between 55% by weight and 95% by weight, preferably between 80% by weight and 95% by weight in the high water absorption polymer particle is between 45 μm (mesh-on of 3300) and 425 μm (mesh-pass of 36). When the water shieldable material in accordance with the present invention is in contact with water, the high water absorption polymer particle can rapidly swell and be removed from the binder to drop away from the solid substrate, and thus the high water absorption polymer particle can shield the water separately and superior water shieldability is attained.

It seems that the high water absorption polymer particle dropping away from the binder when in contact with water in spite of the fact that the binder is non-aqueous, is based on the fact that the diameter of the high water absorption polymer particle is sufficiently large, the polymer particle is arranged so as to be enclosed with a thin membrane of the binder in the coating layer, and continuous or discontinuous air voids are arranged between the polymer particles, and when the polymer particles are in contact with water, the high water absorption polymer particles swell immediately, and at that time the membrane of the binder is not capable of suppressing the swelling potential of the high water absorption polymer particle.

When the diameter of the high water absorption polymer particle is too small, the polymer particles are enclosed in the coating layer and the air voids between the polymer particles become extremely small. Accordingly, when the water shieldable material is in contact with water, a long time is required from the time at which the water shieldable material is first in contact with the water to the time at which the water is actually in contact with the polymer particle and thus the swelling speed is lowered, further even if the polymer particles swell, the polymer particles are not capable of jumping off the coating layer and thus the polymer particles cannot drop away and result in inferior water shieldability. A preferable diameter of the high water absorption polymer particle is between 45 μm and 300 μm, in view of the adhesiveness of the high water absorption polymer particle to the solid substrate.

Figure 2:
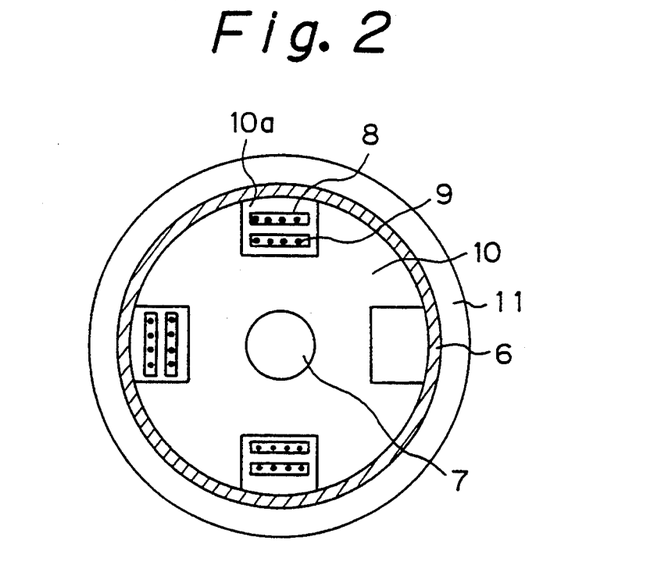
FIG. 2 is an enlarged cross sectional view of a slot type optical fiber cable in which the water shieldable material in accordance with the present invention is used as a water shieldable taps for a hold winding.

It is preferable that the high water absorption polymer having a diameter of under 45 μm is included when the water shielding operation is applied to, for example, minute gaps in a slot, such as a slot 10a in FIG. 2 of an optical fiber cable. In this case, a weight ratio of the particles having a diameter of under 45 μm in all the polymer particles must be under 45% by weight. If the weight ratio is over 45% by weight, the swelling speed becomes lower, and even if the polymer particle can swell, the capability of dropping away from the coating layer is lessened and results in inferior water shieldability.

Figure 3:
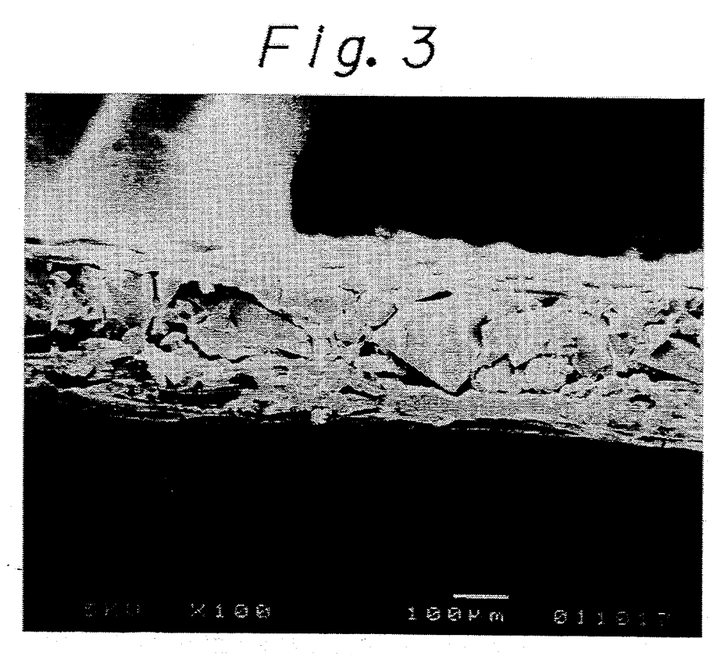
FIG. 3 is a micrograph, a magnification of which is 100, showing the shape of a fiber and the shape and size of the high water absorption polymer particle in a cross section of an example of the water shieldable material in accordance with the present invention.
Figure 4:
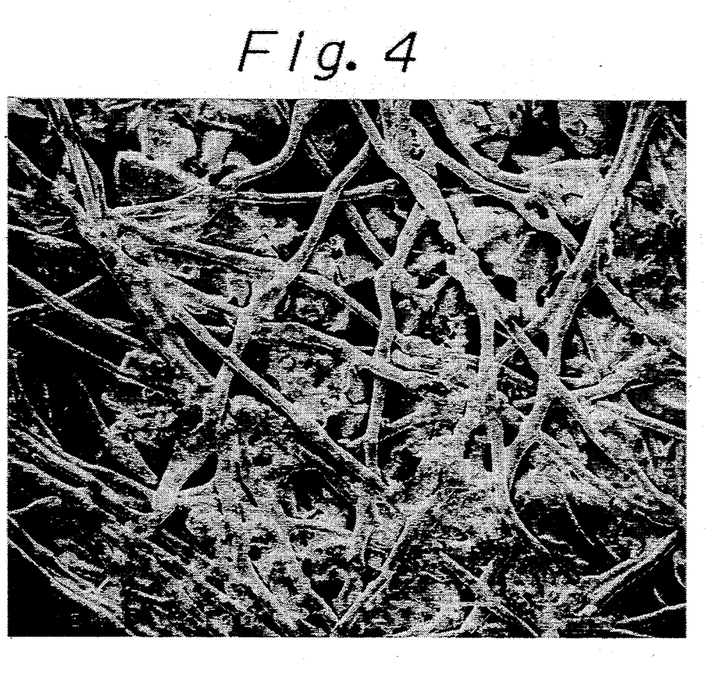
FIG. 4 is a micrograph, a magnification of which is 100, showing the shape of a fiber and the shape and size of the high water absorption polymer particle on a surface of the water shieldable material shown in FIG. 3.
Figure 5:
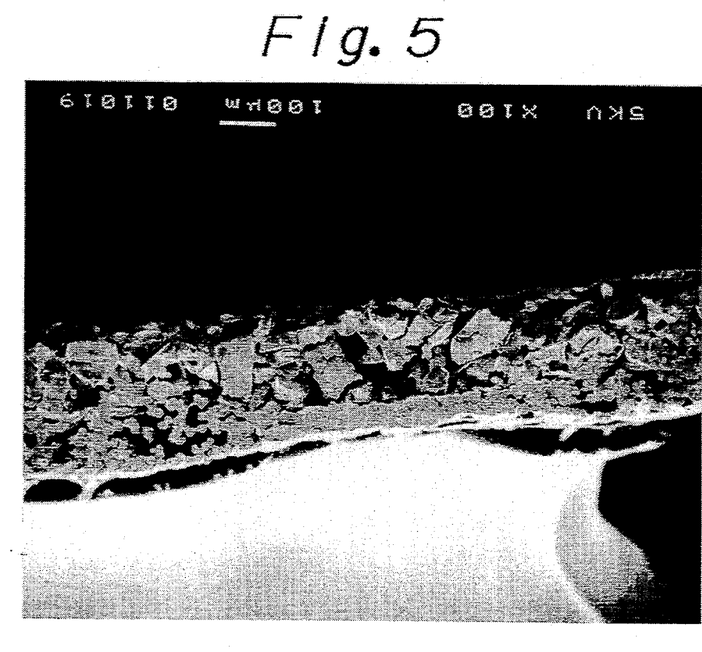
FIG. 5 is a micrograph, a magnification of which is 100, showing the shape of a fiber and the shape and size of the high water absorption polymer particle in a cross section of another example of the water shieldable material in accordance with the present invention.
Figure 6:
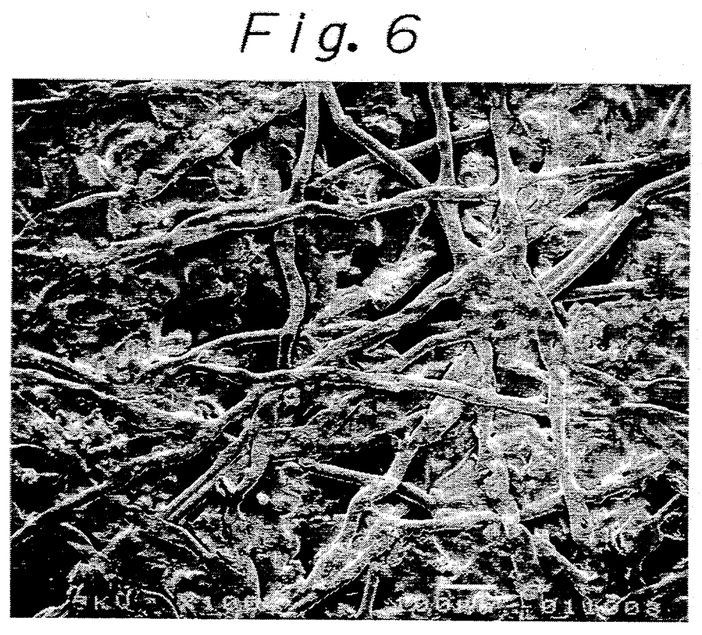
FIG. 6 is a micrograph, a magnification of which is 100, showing the shape of fiber and the shape and size of the high water absorption polymer particle on a surface of the water shieldable material shown in FIG. 5.
Figure 7:
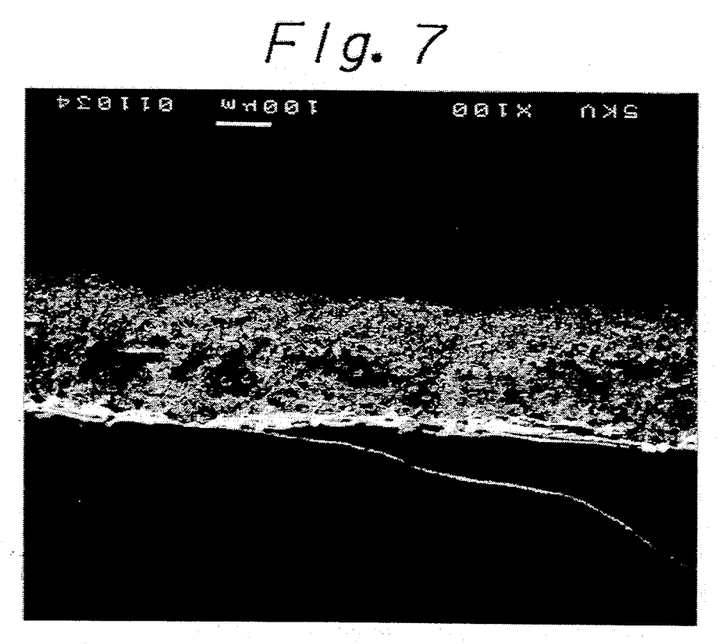
FIG. 7 is a micrograph, a magnification of which is 100, showing the shape of a fiber and the shape and size of the high water absorption polymer particle in a cross section of a conventional water shieldable material.
Figure 8:
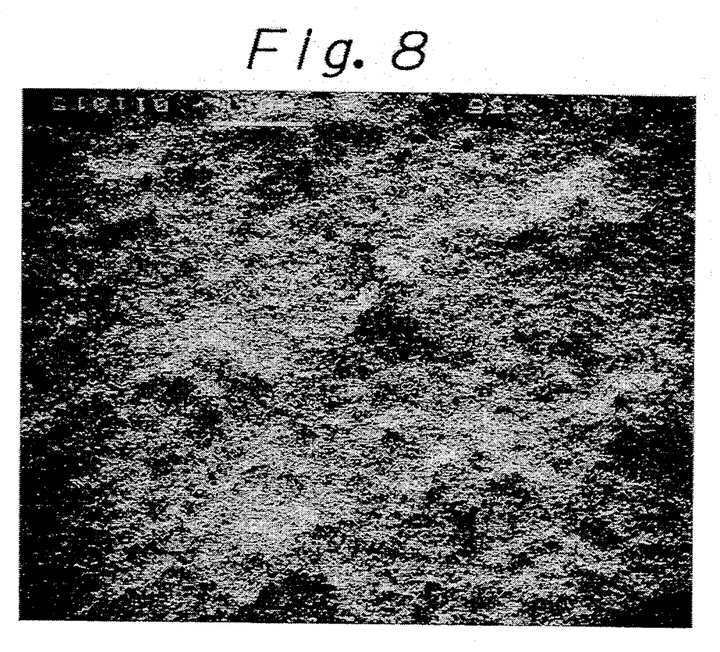
FIG. 8 is a micrograph, a magnification of which is 100, showing the shape of a fiber and the shape and size of the high water absorption polymer particle on a surface of the high water absorption polymer particle shown in FIG. 7.

FIGS. 3 to 8 are micrographs, a magnification of which is 100, showing examples i.e., Examples 1 to 6 and comparative example, i.e., Comparative Example 16 of the water shieldable material in accordance with the present invention, and FIGS. 3, 5 and 7 are cross sectional views and FIGS. 4, 6 and 8 are plain views.

As can be seen from FIGS. 3 and 5 showing the cross sectional views of an example of the water shieldable material in accordance with the present invention, a lot of the high water absorption polymer particles having a significantly large diameter compared with the thickness of the water shieldable material are arranged in the coating layer and a lot of air gaps can be found in circumferential portions of each particle and each particle group. Further, the presence of membranes of the binder and many air voids can be found in FIGS. 3 and 5, and FIGS. 4 and 6, which are corresponding plain views, respectively. A fiber-like material in FIGS. 4 and 6 is a fiber constituting a cover cloth, i.e., a nonwoven fabric in this case, which is described in detail hereinafter, and a solid substrate, i.e., a nonwoven fabric in this case can be observed in the lower side of the coating layer in FIGS. 3 and 5.

A water shieldable material of Comparative Example 1b is shown in FIG. 7 (a cross sectional view) and FIG. 8 (a plain view) and a high water absorption polymer particle having a small diameter is used in this case, but the cover cloth is not used.

A measurement of the diameter of a particle is taken according to JIS Z 8815 i.e., a sieve analysis method, using wire sieves according to JIS Z 8801 i.e., a standard sieve. Namely, several sieves having a mesh size corresponding to a particle diameter of a test sample i.e., a high water absorption polymer is arranged in order from the sieve having a large mesh to the sieve having a small mesh, the test sample is put on the upper most sieve, a pan is arranged on a position below the lowest sieve and then vibration is applied to the set up sieves under conditions according to JIS. After the test sample is treated, the weight of each of the particles on each sieve is measured and a particle size distribution is calculated.

In the water shieldable material in accordance with the present invention, a high water absorption polymer particle having a dropping away ratio of 50% by weight or more, with the measurement being taken after the water shieldable material has been immersed for 10 minutes, is preferably used. The dropping away ratio of the polymer particle can be obtained by the water shieldable material of 1 g being stationary and hanging in 1 liter of a commercially supplied purified water, and the water shieldable material being removed from the water after an immersion time of 10 minutes and dried while maintaining its form, and finally the weight of the residual polymer in the material being measured.

When the dropping away ratio of the high water absorption polymer particle is under 50% by weight, since the number of high water absorption polymer particles dropping away is lessened, the water shieldability of this material is inferior. For example, a coating liquid is prepared by diluting and mixing 70 parts by weight of a polymer particle having a particle diameter of 150 μm or less and sifted from KI gel 201K supplied from Kurare Co., Ltd and having a 20 mesh pass of under 790 μm by using a sieve of 100 mesh, 0.7 parts by weight of potassium octyl phosphate and 30 parts by weight of the rubber group binder with an organic solvent such as toluene, methyl ethyl ketone, ethyl acetate or the like. This coating solution is uniformly coated on a polyester spun bond E-5060, which is a polyester spun bond nonwoven fabric supplied from Asahi Kasei Kogyo Kabushiki Kaisha in such a manner that a pick up of the high water absorption poly becomes 100 g/m², and then the coated material is dried. A 1 gram sample is prepared from the above material, the sample is stationary and hanging in 1 liter of a commercially supplied purified water, and the sample is taken out from the water after an immersion time of 10 minutes and dried while maintaining its form, and finally the weight of the residual polymer in the sample is measured. The dropping away ratio of this high water shieldable material is preferably 50% by weight or more.

It is preferable that the water absorption magnification of the high water absorption polymer in accordance with the present invention and measured by CB method described in detail hereinafter is ten times or more. The water absorption magnification described hereinafter is the water absorption magnification measured by the CB method.

Since it is required that the high water absorption polymer particle be individually separated upon coming into contact with water and spread in a cable, the polymer must have a particle-like shape. But the shape of the particle is not limited to a specific shape and a particle being, for example, perfectly round as obtained by an emulsion polymerization, or having a distorted shape ground at random by a grinder can be used.

As the high water absorption polymer, for example, polyacrylonitrile graftpolymer hydrolyzate, sodium of polyacrylic acid, methyl methacrylic acid.vinyl acetate copolymer hydrolyzate, polyvinyl alcohol hydrolyzate, polyacrylonitrile crosslinked polymer hydrolyzate, polyethylene oxide crosslinked polymer, polyacrylamide crosslinked polymer, acrylamide.acrylic acid crosslinked copolymer, sulfoalkyl(meta)acrylate.acrylic acid crosslinked polymer, and isobutylene.maleic anhydride crosslinked polymer can be preferably used. Further, starch.polyacrylonitrile graft polymer hydrolyzate, starch.acrylic acid graftcopolymer, carboxymethyl cellulose hydrolyzate, cellulose.polyacrylonitrile graft polymer hydrolyzate or the like, which generate hydrogen gas when they are putrefied can also be used by applying a putrefaction treatment.

Second, it is necessary to use a rubber-group binder as a binder binding the high water absorption polymer particle into the coating layer in the water shieldable material in accordance with the present invention. It is preferable that the rubber group binder is a binder that can be solved by an organic solvent such as, for example, toluene methyl ethyl ketone, ethyl acetate or the like, can easily drop away the high water absorption polymer particle from the water shieldable material when the water shieldable material is in contact with water, is capable of lending flexibility to the water shieldable material and does not generate hydrogen gas by putrefaction thereof.

As those rubber group binders, styrene-butadiene rubber, butadiene rubber, isoprene rubber, haloprene rubber, isobutylene rubber, butyl rubber, ethylene.polypropylene rubber, chlorosulfonated polyethylene rubber, silicone rubber, trifluoro.chloroethylene rubber, vinylidene.fluride rubber, dihydro.perfluoro.alkylacrylate rubber, polyurethane rubber, vinyl group rubber or the like can be used and the styrene-butadiene rubber in the above rubbers is preferably used. A styrene-butadiene rubber obtained by block polymerizing styrene of 5% by weight or more, preferably between 10% by weight and 40% by weight is preferable in view of the adhesive force thereof to a substrate, the holdability of a polymer when manufacturing and laying the cable, the water shieldability of the water shieldable material, the covering buffer property, curling protection or the like. A saturated type and an unsaturated type of a styrene-butadiene rubber may be used, but the saturated type styrene-butadiene rubber is preferable in terms of durability. The styrene-butadiene rubber can be used alone or by mixing two or more rubbers. Further the styrene-butadiene rubber may be used with styrene.-butadiene rubber made by random polymerization, butadiene rubber or the like.

Third, it is necessary that the ratio of the total weight of the high water absorption polymer particle and the rubber group binder in the coating layer be 90% by weight or more, the density of the coating layer be between 0.65 g/cm$^3$ and 1.00 g/cm$^3$, and the weight ratio between the high water absorption polymer particle and the rubber group binder be such that the weight ratio of the high water absorption polymer particle is between 50% by weight and 90% by weight, and the weight ratio of the rubber group binder is between 10% by weight and 50% by weight in the water shieldable material in accordance with the present invention.

Although another filler can be added to the high water absorption polymer particle and the rubber group binder in the coating layer, when the filler of 10% by weight or more is added to the coating layer, the water shieldability becomes inferior. A water shieldability of the T-type method of the water shieldable material having a coating layer with a density of under 0.65 g/cm$^3$ is inferior. Further water shieldability, especially the L-type water shieldability having a coating layer with a density of over 1.00 g/cm$^3$ is also inferior.

A method of measuring the density of the coating layer is as follows.

A micrograph, of a cross section of a water shieldable material with a magnification of 100 is taken by a microscope as shown in FIG. 1. The thickness ($T_{i-s}$) of the solid substrate in the micrograph is measured and the volume ($V_s$) per unit area is calculated on the basis of the obtained thickness. Further, the weight ($W_s$) per unit area of the solid substrate is measured. The thickness ($T_{i-T}$) of the water shieldable material is measured by a thickness tester and the volume ($V_T$) per unit area is calculated on the basis of the obtained thickness. Further, the weight ($W_T$) per unit area of the water shieldable material is measured. The density of the coating layer is calculated by the following equation.

$$\rho_{ct} = W_{ct}/V_{ct}$$

wherein:

$\rho_{ct}$: a density of the coating layer (g/cm$^3$)
$W_{ct}/V_{ct}$ can be calculated by the following equations $$V_s = T_{i-s} \times A \times B$$

wherein:

$V_S$: Volume of solid substrate (cm$^3$)
$T_{i-s}$: Thickness of solid substrate (cm)
A: Width of solid substrate, i.e., water shieldable material (cm)
B: Length of solid substrate, i.e., water shieldable material (cm)

$$V_T = T_{i-T} \times A \times B$$

wherein:

$V_T$: Volume of water shieldable material (cm$^3$)
$T_{i-T}$: Thickness of water shieldable material (cm)

$$W_{ct} = W_T - W_s$$

wherein:

$W_{cT}$: Weight of coating layer (g)
$W_T$: Weight of water shieldable material (A×B) (g)
$W_S$: Weight of solid substrate (A×B) (g)

$$V_{ct} = V_T - V_S$$

wherein $V_{cf}$: Volume of coating layer (cm³)

It is possible to obtain a coating layer having the density of between 0.65 g/cm³ and 1.00 g/cm³ by compressing a water shieldable material coated by a conventional coating method by using a high pressure calender.

The water shieldable material in accordance with the present invention can have superior water shieldability because the diameter of the high water absorption polymer particle in the coating layer is between 45 μm and 425 μm, and the density of the coating layer is between 0.65 g/cm³ and 1.00 g/cm³. Even if the diameter of the high water absorption polymer particle is under 45 μ, a coating layer having a density of between 0.65 g/cm³ and 1.00 g/cm³ can be obtained, but the L-letter water shieldability of the obtained water shieldable material is inferior.

As described herebefore, it is necessary that the weight ratio between the high water absorption polymer particle and the rubber group binder be such that the weight ratio of the high water absorption polymer particle is between 50% by weight and 90% by weight, and the weight ratio of the rubber group binder is between 10% by weight and 50% by weight in the water shieldable material in accordance with the present invention. But it is preferable that the weight ratio be between 70% by weight and 85% by weight for the high water absorption polymer particle and between 15% by weight and 30% by weight for the rubber group binder. When the weight ratio of the high water absorption polymer particle is under 50% by weight and the weight ratio of the rubber group binder is over 50% by weight, the dropping away ratio of the high water absorption polymer particle becomes lower. When the weight ratio of the high water absorption polymer particle is over 90% by weight and the weight ratio of the rubber group binder is under 10% by weight, the holding property of the high water absorption polymer particle is inferior and thus the polymer particle may drop away from the coating layer before the water shieldable material is in contact with the water.

Since the rubber group binder is hydrophobic, there is a possibility that the binder will repel the water and thus the water shieldability will be inferior. In this case, it is possible to improve the water shieldability by adding a hydrophilic agent such as an alkali metal salt of alkylphosphate.

A material having superior durability and, especially, that does not generate hydrogen gas by putrefaction thereof can be used as a solid substrate used in the water shieldable material in accordance with the present invention. For example, a woven fabric, a knitted fabric, a nonwoven fabric, a mesh-like woven fabric, a mesh-like knitted fabric, a film or the like of an acrylic group synthetic fiber, a polyester group synthetic fiber, a polyamide group synthetic fiber, a polypropylene group synthetic fiber or the like can be used.

A method of manufacturing the water shieldable material in accordance with the present invention will be described hereafter.

The water shieldable material in accordance with the present invention can be obtained by, for example, coating a coating liquid prepared by uniformly dispersing a high water absorption polymer into a rubber group binder dissolved in an organic solvent to at least one surface of a solid substrate, evaporating the organic solvent and fixing the polymer to the substrate by heating. When the quantity of the coating liquid is excessive, the thickness of the water shieldable material is excessive and problems arise thereupon. Accordingly, it is preferable to control the thickness of the water shieldable material by a high pressure calender press machine or the like, which is useful for applying a desired density to the coating layer.

The water shieldable material in accordance with the present invention having a nonwoven sheet (referred to as a cover cloth, hereafter) of a thermoplastic synthetic fiber and having voids through which a distended water absorption polymer particle may pass, a PVA film of water solubility, or a parting agent of polymethylsiloxane on a surface of the coating layer has an advantage because the handling properties during treatment using the high pressure calender press machine is superior. Namely, the coating layer in the water shieldable material in accordance with the present invention is held to the solid substrate in such a manner that the high water absorption polymer particles do not exit outward when the water shieldable material is not in contact with the water, in addition, an improvement in the slipperiness of the surface of the water shieldable material and the ease by which water shieldable material is handled is apparent by providing the cover cloth or the like.

In the optical fiber cable, there is a possibility that when the cable absorbs moisture in an environment having a wide variation of moisture and the water shieldable material becomes sticky, the water shieldable material will adhere to an optical fiber tape in the optical fiber cable, and strain is generated in the optical fiber cable because of the difference in the longitudinal expansion coefficient between the optical fiber cable and the water shieldable material thereby resulting in a large electrical transmission loss in the optical fiber cable. In the optical fiber cable using the water shieldable material including the cover cloth, adhesion of the water shieldable material to the cable will not occur and thus an electrical transmission loss will not occur.

The cover cloth can be prepared from a nonwoven fabric having voids capable of passing the swelled polymer particles, good durability with no probability of generating hydrogen gas by putrefaction thereof. In particular, it is preferable to use the nonwoven sheet of a thermoplastic synthetic fiber. In this nonwoven sheet, interlaced points formed by a plurality of fibers constituting the nonwoven sheet are fused on each surface and are arranged in random, and a plurality of the fibers are bonded in a tongue-like shape or a web-like shape at each interlacing point. When assuming the shape of a void between the fibers formed by the interlacing points is a polygon, it is preferable that the voids 50% or more in all the voids of the nonwoven sheet is a void such that the sum of the lengths of the sides of the void is 0.3 mm or more, and the voids of 90% or more in all the voids of the nonwoven sheet is a void such that the sum of the lengths of the sides of the void is 5 mm or less. The nonwoven sheet can be manufactured by stretching or biaxially orienting a polyester spun bond nonwoven sheet having a weight per unit area of 40 g/m², while heating and mixing a staple fiber of a synthetic fiber with a thermal fusible fiber or applying the thermal bonding method to the thermal fusible fiber.

When the PVA film is used for the same object as that of the cover cloth, a lowering of the swelling speed of the water shieldable material in the water can be improved by providing holes in a film. In this case, a preperforated film may be used, or a hole may be perforated on a film adhered on the water shieldable material.

FIG. 2 shows an enlarged cross sectional view of a slot and water run proofing type fiber cable using an example of the water absorption tape in accordance with the present invention. This cable comprises a tension member 7 arranged on the most center position of the cable as a core, a slot-type spacer 10 arranged around the tension member 7 and including slots 10a, optical fiber core tape 8 arranged in the slots 10a, optical fibers 9 accommodating the optical fiber core tape 8, a water shieldable tape 6 for a hold winding arranged around the spacer 10 and made of the water shieldable material, and a jacket 11. When cracks are generated in the jacket 11 and water flows into the cable, the high water absorption polymer particle held in the water shieldable type 6 rapidly absorbs the water and swells, and thus the polymer particles drop down into the slot 10a and spread. Accordingly, the optical fiber cable having the above-described constitution can prevent the intrusion of water for a long period of time.

A water proofing of the optical fiber cables can be attained by using the water absorption tape in accordance with the present invention only as the hold winding water shieldable tape 6.

The present invention will be described in detail by the following examples. % and part used in the examples refers to % by weight and part by weight.

Water absorption magnification, putrefaction test, water shieldability and a dropping away ratio measurements in the examples are taken by the following method.

(1) Water absorption magnification according to CB method

A test piece having a weight of X is immersed into commercially supplied purified water at 23° C. for 1 hour, and then is placed into a tubular metal wire cage of 300 mesh stainless steel and placed into the stainless tube of a spin-drier for 10 minutes to remove the water. The test piece with the cage is subjected to a water removing operation with a force of 100 G for 1 minute. The test piece is then removed from the spin-drier and the weight (Y) of the test piece is measured. A value X is the weight of the test piece obtained after the test piece is dried at 105° C. in a hot air dryer until a change in the weight of the test piece reaches zero. The water absorption magnification (GB) of the test piece is calculated according to the following equation.

When the water absorption magnification for water having high ionicity is measured, artificial water (Aquamarine supplied from Yasu Yakuhin Sha) is used in place of the purified water.

Water absorption magnification $= (Y-X)/X - 1$ (2) Putrefaction test

A 4 g of test sample and 0.4 g of monoammonium phosphate and 200 cc of a soil extraction liquid are placed into a triangular glass flask. The flask is closed with a cock, mixed and kept in the shade at 30° C. for 30 days. The cock is then removed from the flask, and 2 to 3 cc of the generated gas in the flask is analyzed by a gas chromatography, and the color and state of the liquid are observed visually.

Preparation of the soil extraction liquid is as follows.

a) A soil sample is taken from a location with fallen leaves and grass.
b) The soil sample of 500 g and 2000 cc of pure water are placed in a vessel and mixed.
c) After 12 hours, a supernatant liquid is filtered and 50 cc of the filtered liquid is added to 1500 cc of water to prepare the soil extraction liquid.
d) The soil and the soil extraction liquid should be newly prepared or extracted for each test batch.

(3) Water shieldability a) L-letter method

Figure 9:
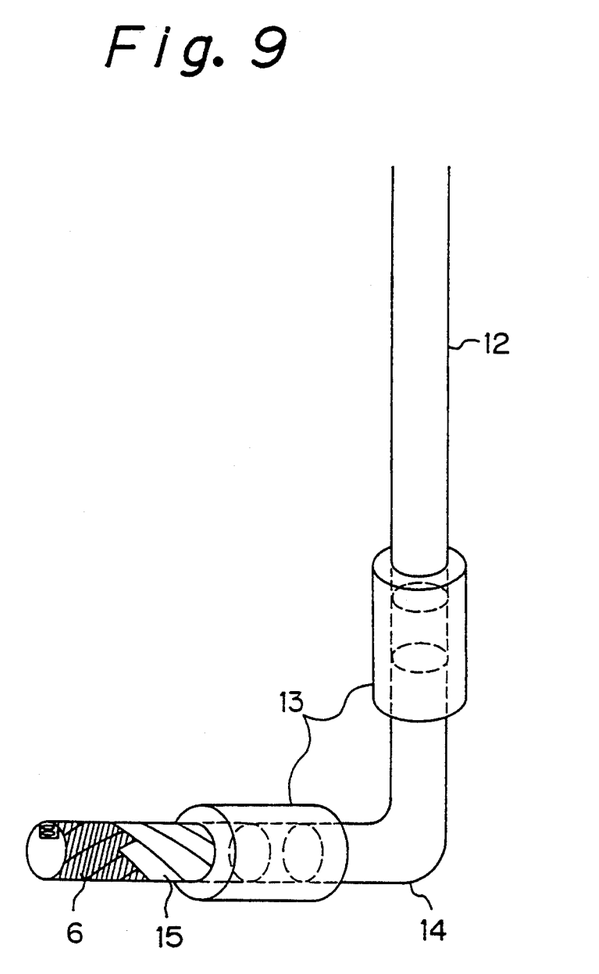
FIG. 9 is a perspective view showing a connecting portion of an L-letter tube used in the L-letter measuring method, which is one method of evaluating the water shieldability of the water shieldable material in accordance with the present invention.
Figure 10:
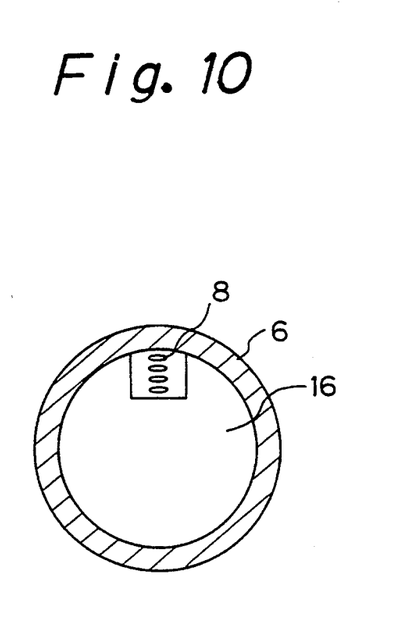
FIG. 10 is a cross sectional view of the L-letter tube shown in FIG. 9.

FIG. 9 shows a perspective view of an apparatus for measuring water shieldability according to the L-letter method, and FIG. 10 shows a cross sectional view of a bar 16 used in the apparatus.

A groove, i.e., slot having a width of 1.6 mm and a depth of 2.0 mm runs in a longitudinal direction of a 1.5 cm polyacetal cylindrical bar 16 as shown in FIG. 10. Four sheets of optical fiber core tapes 8 having a thickness of 0.4 mm and a width of 1.1 mm are accommodated in the groove of the bar 8. The whole surface of the bar 16 is covered with a hold winding water shieldable tape 6 and a sealing vinyl tape 15 to form a body having a structure similar to an optical fiber cable, i.e., modified cable. The modified cable with opened ends is arranged horizontally, and an opened end is connected through a rubber tube 13 to a vertical glass tube 12 having an inner diameter of 10 mm. Water is poured into the tube 12 such that the height of the water in the vertical glass tube 12 is 1 m from the position of the horizontal modified cable. After 24 hours, the amount of water in the water shieldable tape in the modified cable is measured. If the amount of water is small, the water shieldability of the water shieldable material is considered good.

b) T-letter method

FIG. 10 shows a perspective view of an apparatus for measuring water shieldability according to the T-letter method.

Figure 11:
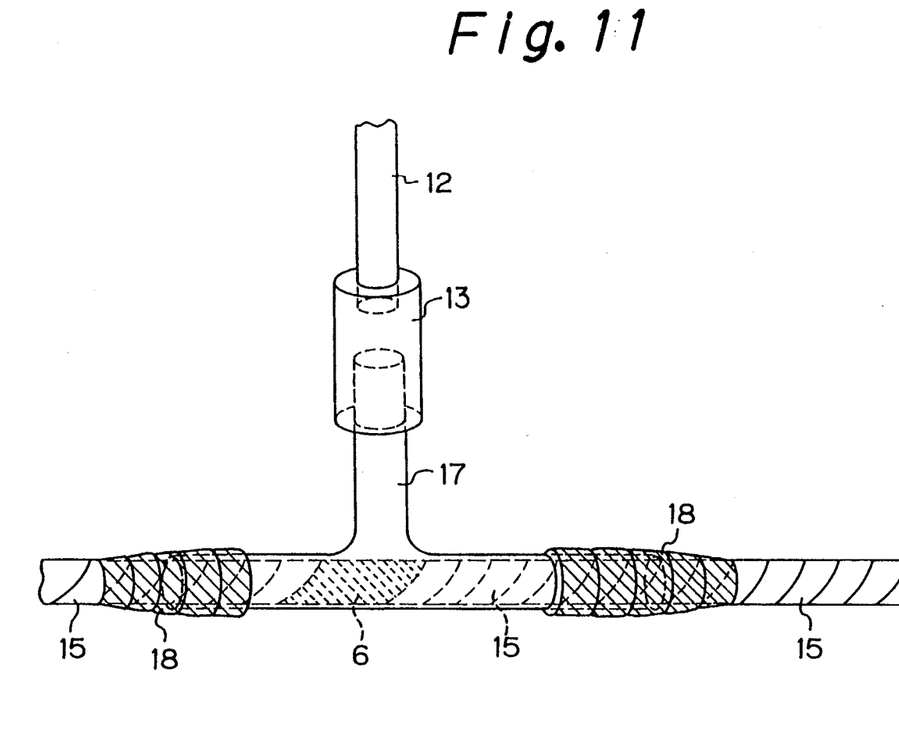
FIG. 11 is a perspective view showing a connecting portion of a T-letter tube used in the T-letter measuring method, which is one method of evaluating the water shieldability of the water shieldable material in accordance with the present invention.

A groove, i.e., a slot having a width of 1.6 mm and a depth of 2.00 mm runs along the longitudinal direction of a polyacetal cylindrical bar having a diameter of 1.5 cm and a length of 4 m, as shown in FIG. 11. Four sheets of optical fiber core tapes having a thickness of 0.4 mm and a width of 1.1 mm are accommodated in the groove of the bar. The whole surface of the bar is covered with a hold winding water shieldable tape 6 and a sealing vinyl tape 15 to form a body having a structure similar to an optical fiber cable, i.e., a modified cable. The modified cable with opened ends is arranged horizontally, and a portion of the sealing vinyl tape 15 having a width of 2 cm at the center of the bar, i.e., a point equally remote from both ends is peeled. The modified bar is placed into a tube 17 having a T-letter shape, a length of 10 cm and an inner diameter of 1.8 cm, and the peeled portion is set at a central portion of the T-letter tube. Both ends of the T-letter tube are connected and sealed to the modified cable by vinyl tape 18. A vertical portion of the T-letter tube 17 is connected through a rubber tube 13 to a glass tube 12 having an inner diameter of 10 mm. Water is poured into the glass tube such that the height of the water in the glass tube is 1 m from the position of the horizontal modified cable. After 24 hours, the amount of water in the water shieldable tape in the modified cable is measured and if the amount of water is small, the water shieldability of the water shieldable material is considered good.

(4) Dropping away ratio

A test piece of the water shieldable material having a definite area (S) is prepared, and the weight (A) of the test piece is measured. The test piece is immersed into commercially supplied purified water at 23° C. for 10 minutes. The test piece is then removed and dried at 105° C. and the weight (B) of the dried test piece is measured. Further, the weight of the water absorption polymer (C) included in the definite area (S) of the water shieldable material is calculated on the basis of ratios of the high water absorption polymer and the rubber group binder or the like and the dropping away ratio is calculated from the following equation.

The values of A, B and C in the equation are weights obtained after the test piece is dried in a hot air dryer at 105° C. such that a change in the weight of the test piece becomes zero.

Dropping away ratio (%)=(A−B)/C

EXAMPLE 1

The following materials are mixed and uniformly dispersed.

| | |
|---|---|
| TUFDENE 1000 (stylenebutadiene group rubber) supplied from Asahi Kasei Kogyo Kabushiki Kaisha | 15 parts |
| TUFPRENE A (Stylenebutadiene group rubber) supplied from Asahi Kasei Kogyo Kabushiki Kaisha | 15 parts |
| KI gel 201K.F3 (isobutylene.maleic anhydride crosslinked copolymer in which particles having a diameter between 45 $\mu$m and 425 $\mu$m of 91% by weight is included) supplied from Kurare Kabushki Kaisha | 70 parts |
| Potassium octyl phosphate | 0.7 parts |
| Toluene (used as a diluent) | 90 parts |

The dispersion liquid is coated on a polyester spun bond E-5060 (polyester spun bond nonwoven fabric) supplied from Asahi Kasei Kogyo Kabushiki Kaisha in such a manner that the pick-up value of the high water absorption polymer becomes 100 g/m$^2$, and a coated nonwoven fabric is dried. SMASH YR10 (polyester spun bond nonwoven fabric having the weight per unit area of 10 g/m$^2$) supplied from is placed on the coating layer of the coated sheet, and is then treated with a high pressure calender having a linear pressure of 70 kg/cm and a temperature of 50° C. The density of the obtained coating layer is 0.76 g/cm$^3$. The obtained water shieldable material is cut to a water shieldable tape having a width of 2.5 cm. The water shieldability of the obtained material is measured and the obtained results are shown in Tables 1 and 2. As can be seen in Table 2, the example has superior water shieldability in the L-letter method and T-letter method. The workability in cable connection and covering buffer properties of the Example are superior, and the generation of a hydrogen gas cannot be found in the putrefaction test. Micrographs of the water shieldable material in Example 1 are shown in FIG. 3 (cross sectional view) and FIG. 4 (plain view).

Comparative Example 1a

A water shieldable material of Comparative Example 1a is prepared using the same treatments as those in Example 1, until the coating process and the drying process. The density of the coating layer in this Comparative Example 1a is 0.88 g/cm$^3$.

The obtained material is slit with a tape having a width of 2.5 cm and the water shieldability is measured. The obtained results are shown in FIGS. 1 and 2. Workability in cable connection and covering buffer properties of this Comparative Example are superior, and the generation of a hydrogen gas cannot be found in the putrefaction test. As shown in Table 2, the water shieldability according to the L-letter method is superior, but water shieldability according to the T-letter method is inferior.

Comparative Example 1b

A water shieldable material of Comparative Example 1b is prepared using the same treatments as those in Example 1, until the high pressure calendering treatment, except that KI gel 201K.F4Q (isobutylene.maleic anhydride crosslinked copolymer in which particles having a diameter between 45 $\mu$m and 425 $\mu$m of 13.7% and particles having a diameter under 45 $\mu$m of 86.3% by weight are included) supplied from Kurare Kabushiki Kaisha is used in place of KI gel 201K.F3. The density of the obtained coating layer is 0.88 g/cm$^3$. The obtained water shieldable material is cut to a tape having a width of 2.5 cm and the water shieldability is measured. The obtained results are shown in Tables 1 and 2. As shown in Table 2, the water shieldability according to the T-letter method is superior, but the water shieldability according to the L-letter method is inferior. Generation of a hydrogen gas cannot be found in the putrefaction test. Micrographs of the water shieldable material in Comparative Example 1b are shown in FIG. 7 (cross sectional view) and FIG. 4 (plain view).

EXAMPLE 2

A water shieldable material of Example 2 is prepared using the same treatments as those in Example 1 until the high pressure calendering treatment, except that KI gel 201K.F4Q (particles having a diameter between 45 $\mu$m and 425 $\mu$m of 90% by weight or more is included) is used in place of KI gel 201K.F3. The density of the obtained coating layer is 0.91 g/cm$^3$. The obtained water shieldable material is cut to a tape having a width of 2.5 cm and the water shieldability is measured. The obtained results are shown in Tables 1 and 2. As shown in Table 2, the water shieldability of Example 2 is superior in both the L-letter method and the T-letter method. Workability in cable connection and covering buffer properties of this Example are superior, and the generation of hydrogen gas cannot be found in the putrefaction test.

Comparative Example 1c

A water shieldable material of Comparative Example 1c is prepared using the same treatment as those in Example 1, except that the content of TUFDENE 1000 is changed to 7.5 parts and the content of TUFPRENE A is changed to 7.5 parts. The density of the obtained coating layer is 0.70 g/cm$^3$. The water shieldability of this Comparative Example 1c is measured and the obtained results are shown in Tables 1 and 2. As shown in Table 1, the high water absorption polymer particle in this Comparative Example 1c is likely to drop away before the material is in contact with the water and thus the water shieldability is inferior. Generation of hydrogen gas cannot be found in the putrefaction test.

Comparative Example 1d

A water shieldable material of Comparative Example 1d is prepared using the same treatments as those in Example 1 until the high pressure calendering treatment, except that KI gel 201K.F2 (isobutylene.maleic anhydride crosslinked copolymer in which particles having a diameter between 45 μm and 425 μm of 13.7% and particles having a diameter under 45 μm of 86.3% by weight are included) supplied from Kurare Kabushiki Kaisha is used in place of KI gel 201K.F3. The density of the obtained coating layer is 1.11 g/cm³. The obtained water shieldable material is cut to a tape having a width of 2.5 cm and the water shieldability is measured. The obtained results are shown in Tables 1 and 2. As shown in Table 2, the water shieldability according to the T-letter method is superior, but the water shieldability according to the L-letter method is inferior. Generation of hydrogen gas cannot be found in the putrefaction test.

EXAMPLE 3

The following materials are mixed and uniformly dispersed.

| | |
|---|---|
| TUFDENE 2100R (stylenebutadiene group rubber) supplied from Aasahi Kasei Kogyo Kabushiki Kaisha | 2.07 parts |
| SOLPRENE T411 (Stylenebutadiene group rubber) supplied from Aasahi Kasei Kogyo Kabushiki Kaisha | 2.07 parts |
| KI gel 201K.F3 (isobutylene.maleic anhydride crosslinked copolymer in which particles having a diameter between 45 μm and 425 μm of 91% by weight is included) Supplied from Kurare Kabushiki Kaisha | 9.7 parts |
| AK510 (sodium dialkylsulfosuccinate group hydrophilic agent supplied from Marubishi Yuka Kogyo Sha) | 0.1 parts |
| SUMILIZER BP76 (phenol group primary antioxidant supplied from Sumitomo Chemical Industry Co. Ltd.) | 0.05 parts |
| SUMILIZER TPD (organic sulfur secondary antioxidant supplied from Sumitomo Chemical Industry Co. Ltd.) | 0.05 parts |
| Toluene (used as a diluent) | 90 parts |

The dispersion liquid is coated on a polyester spun bond E-5060 in such a manner that the pick-up of the high water absorption polymer becomes 100 g/m², and the coated nonwoven fabric is dried. SMASH YR10 is placed on the coating layer of the coated sheet, and is then treated with a high pressure calender having a linear pressure of 70 kg/cm and a temperature of 50° C. The density of the obtained coating layer is 0.78 g/cm³. The obtained water shieldable material is cut to a water shieldable tape having a width of 2.5 cm. The water shieldability of the obtained material is measured and the obtained results are shown in Tables 1 and 2. As shown in Table 2, the water shieldability of Example 3 is superior in both the L-letter method and the T-letter method. Workability in cable connection and covering buffer properties of the Example 3 are superior, and the generation of hydrogen gas cannot be found in the putrefaction test.

Comparative Example 2

A water shieldable tape of Comparative Example 2 is prepared using the same treatment as that in Example 2, except that the content of TUFDENE 2100R is changed to 4.85 parts, the content of SOLUPULEN T411 is changed to 4.85 parts, and the content of KI gel 201K.F3 is changed to 4.14 parts. The density of the obtained coating layer is 0.76 g/cm³. The water shieldability is measured and the obtained results are shown in Table 1 and 2. As shown in Table 2, the water shieldability of this Comparative Example 2 is inferior. Generation of hydrogen gas cannot be found in the putrefaction test.

EXAMPLE 4

A water shieldable tape of Example 4 is prepared using the same treatment as that in Example 1, except that DIENE 35R (butadiene group rubber, supplied from Asahi Kasei Kogyo Kabushiki Kaisha) is used in place of TUFDENE 1000, and TUFTEC H1052 (stylenebutadiene group rubber supplied from Asahi Kasei Kogyo Kabushiki Kaisha) is used in place of TUFPRENE A. The density of the obtained coating layer is 0.77 g/cm³. The water shieldability is measured, and the obtained results are shown in Tables 1 and 2.

As shown in Table 2, the water shieldability of Example 4 is superior in both the L-letter method and the T-letter method. Workability in cable connection and covering buffer properties of this Example are superior, and generation of hydrogen gas cannot be found in the putrefaction test.

Comparative Example 3

A water shieldable tape of Comparative Example 3 is prepared using the same treatment as that in Example 1, except that CEMEDINE 198L (vinyl acetate group binder, supplied from Cemedine Sha) is used in place of a stylenebutadiene rubber, and methanol is used as a solvent. The density of the obtained coating layer is 0.51 g/cm³. The water shieldability is measured, and the obtained results are shown in Tables 1 and 2. As shown in Table 2, the tape of Comparative Example 3 is hard to handle and thus the handling properties of the tape are inferior and the water shieldability is also inferior. Generation of hydrogen gas cannot be found in the putrefaction test.

EXAMPLE 5

A water shieldable tape of Example 5 is prepared by the same treatment as that in Example 2, except that Aqualic CS-7R (sulfoalkylacrylate group crosslinked polymer in which particles having a diameter between 45 μm and 425 μm of 65% by weight is included, and supplied from Nihon Shokubai Sha) is used in place of KI gel 201K.F3. The density of the obtained coating layer is 0.82 g/cm³. The water shieldability is measured, and the obtained results are shown in Table 1 and 2. As shown in Table 2, the water shieldability of Example 5 is superior in both the L-letter method and the T-letter method. Generation of hydrogen gas cannot be found in the putrefaction test.

EXAMPLE 6

A water shieldable material of Example 6 is prepared using the same treatment as that in Example 1, except that KI gel 201K.F4 (isobutylene.maleic anhydride crosslinked copolymer in which particles having a diameter between 45 μm and 425 μm of 80% by weight and supplied from Kurare Sha) of 70 parts is used in place of KI gel 201K.F3. The density of the obtained coating layer is 0.87 g/cm³. The water shieldability is measured and the obtained results are shown in Tables 1 and 2. As shown in Table 2, the water shieldability of Example 6 is superior in both the L-letter method and the T-letter method. Generation of hydrogen gas cannot be found in the putrefaction test. Micrographs of the water shieldable material in Example 6 are shown in FIG. 5 (cross sectional view) and FIG. 6 (plain view).

Comparative Example 1a is superior, but the water shieldability according to the T-letter method is inferior as described herebefore.

TABLE 1

|  | Water absorption polymer | | Content in coating layer | | |
|---|---|---|---|---|---|
|  | Content of particles having a diameter between 45 μm and 425 μm (%) | Water absorption magnification (artificial sea water) | Water absorption polymer (%) | Binder (%) | Other filler |
| Example 1 | 91.2 | 13 | 69.5 | Rubber group 29.8 | 0.7 |
| Comparative Example 1a | 91.2 | 13 | 69.5 | Rubber group 29.8 | 0.7 |
| Comparative Example 1b | 13.7 | 13 | 69.5 | Rubber group 29.8 | 0.7 |
| Example 2 | 99 or more | 13 | 69.5 | Rubber group 29.8 | 0.7 |
| Comparative Example 1c | 91.2 | 13 | 69.5 | Rubber group 14.9 | 15.6 |
| Comparative Example 1d | 13.7 | 13 | 69.5 | Rubber group 29.8 | 0.7 |
| Example 3 | 91.2 | 13 | 69.1 | Rubber group 29.5 | 1.4 |
| Comparative Example 2 | 91.2 | 13 | 29.6 | Rubber group 69.0 | 1.4 |
| Example 4 | 91.2 | 13 | 69.5 | Rubber group 29.8 | 0.7 |
| Comparative Example 3 | 91.2 | 13 | 69.5 | non rubber group 29.8 | 0.7 |
| Example 5 | 65.0 | 12 | 69.1 | Rubber group 29.5 | 1.4 |
| Example 6 | 80.0 | 13 | 69.5 | Rubber group 29.8 | 0.7 |

TABLE 2

|  | Density of coating layer (g/cm³) | Water shieldability | | Handling property |
|---|---|---|---|---|
|  |  | L-letter method (cm) | T-letter method (cm) |  |
| Example 1 | 0.76 | 408 | 5 | good |
| Comparative Example 1a | 0.46 | 303 | 73 | good |
| Comparative Example 1b | 0.88 | 1000 | 5 | good |
| Example 2 | 0.91 | 430 | 26 | good |
| Comparative Example 1c | 0.70 | 750 | 140 | inferior |
| Comparative Example 1d | 1.11 | 1000 or more | 8 | good |
| Example 3 | 0.78 | 402 | 5 | good |
| Comparative Example 2 | 0.76 | 1000 or more | 77 | good |
| Example 4 | 0.77 | 295 | 8 | good |
| Comparative Example 3 | 0.51 | 650 | 85 | inferior |
| Example 5 | 0.82 | 330 | 6 | good |
| Example 6 | 0.87 | 395 | 6 | good |

The dropping away ratio of a high water absorption polymer particle in the water shieldable material of Example 1, Comparative Examples 1a, 1b and 1d, and Example 6 are measured, and the obtained values are shown in Table 3 with a weight per unit area (g/m²) of the corresponding water shieldable materials and a weight per m² of the high water absorption polymer before dropping away thoseof.

TABLE 3

|  | Weight per unit area of water shieldable material (g/m²) | Weight of polymer particle (g/m²) | Dropping away ratio (%) (purified water) |
|---|---|---|---|
| Example 1 | 213 | 100 | 85.1 |
| Comparative Example 1a | 203 | 100 | 94.6 |
| Comparative Example 1b | 189 | 88 | 16.6 |
| Comparative Example 1d | 199 | 88 | 19.3 |
| Example 6 | 193 | 86 | 84.2 |

As shown in Table 3, the dropping away ratio of the water shieldable materials in Examples 1 and 6, and Comparative Example 1a are high, but the dropping away ratio of the water shieldable materials in Comparative Examples 1b and 1d are lower. Note that the water shieldability according to the L-letter method in

CAPABILITY OF EXPLOITATION IN INDUSTRY

The water shieldable material in accordance with the present invention is a material having superior water shieldability in both the L-letter method and the T-letter method, and is capable of completely satisfying the characteristics that are required of the water shieldable material, such as a non-curling property for various moisture, a stickproofing property, a covering buffer property, a non-putrefaction property, cable moldability or the like. Accordingly, the water shieldable material in accordance with the present invention can be used as a hold winding tape of an electrical wire cable and an optical fiber cable.

We claim:

1. A water shieldable material comprising a solid substrate and a coating layer arranged on the solid substrate and comprising a high water absorption polymer particle having a water absorption magnification of ten times or more and a rubber group binder, characterized in that
    (a) the density of the coating layer is between 0.65 g/cm³ and 1.00 g/cm³,
    (b) the ratio of the total weight of the high water absorption polymer particle and the rubber group binder in the coating layer is 90% by weight or more,
    (c) the weight of the high water absorption polymer particle and the rubber group binder being the total weight of polymer and binder so that the weight of the high water absorption polymer particle is between 50% by weight and 90% by weight of the total weight of polymer and binder and the weight ratio of the rubber group binder is between 10% by weight and 50% by weight of the total weight of polymer and binder, and
    (d) 55% to 95% by weight of the high water absorption polymer particles have a diameter of 45 μm to 425 μm.
    (e) the dropping away ratio of said high water absorption polymer particle from said water shieldable material based on the total quantity of the high water absorption polymer is 50% weight:
    wherein the dropping away ratio is measured after the water shieldable material is immersed in water for 10 minutes.

2. A water shieldable material according to claim 1, characterized in that the weight ratio of the particle having a diameter of under 45 μm in the high water absorption polymer particle is between 5% by weight and 45% by weight.

3. A water shieldable material according to claim 1, characterized in that the high water absorption polymer is a polymer selected from a group of polyacrylonitrile graftpolymer hydrolyzate, sodium polyacrylic acid, methyl methacrylic acid.vinyl acetate copolymer hydrolyzate, polyvinyl alcohol hydrolyzate, polyacrylonitrile closslinked polymer hydrolyzate, polyethylene oxide crosslinkedpolymer, polyacrylamide closslinked polymer, acrylamide.acrylic acid crosslinked copolymer, sufoalkyl(meta)acrylate.acrylic acid crosslinked polymer, and isobutylene.maleic anhydride crosslinked polymer.

4. A water shieldable material according to claim 1, characterized in that the high water absorption polymer is a polymer obtained by applying a putrefaction proofing treatment to a polymer selected from a group of starch.polyacrylonitrile graft polymer hydrolyzate, starch.acrylic acid graftcopolymer, carboxymethyl cellulose hydrolyzate, and cellulose.polyacrylonitrile graft polymer hydrolyzate.

5. A water shieldable material according to claim 1, characterized in that the rubber group binder is a binder that can be solved by an organic solvent, can easily drop away the high water absorption polymer particle from the water shieldable material when the water shieldable material is in contact with water, imparts flexibility to the water shieldable material, and does not generate hydrogen gas by putrefaction thereof.

6. A water shieldable material according to claim 1 characterized in that a hydrophilic agent is included in the rubber group binder.

7. A water shieldable material according to claim 1, characterized in that the coating layer is compressed by a calendering treatment.

8. A water shieldable material according to claim 1, characterized in that the solid substrate is a spun bond nonwoven fabric.

9. A water shieldable material according to claim 1, characterized in that a nonwoven fabric is further arranged on a surface of the coating layer, and a number of voids are formed between fibers constituting the nonwoven fabric and a number of voids having a sum of lengths of sides of the voids of 0.3 mm or more, when the shape of the void is assumed to be a polygon, being 50% or more in all of the voids formed in the nonwoven fabric.

* * * * *

UNITED STATES PATENT AND TRADEMARK OFFICE
CERTIFICATE OF CORRECTION

PATENT NO. : 5,350,617

DATED : September 27, 1994

INVENTOR(S) : Noriaki Fujisawa et al.

Page 1 of 2

It is certified that error appears in the above-indentified patent and that said Letters Patent is hereby corrected as shown below:

Title page , Inventors, change to read -- Noriaki Fujisawa, Nara; Yasuro Sakai, Osaka; Tsuneo Kuwabara; Shigezou Kukita, both of Kanagawa, all of Japan--

Claim 1, column 18, line 58, delete "and" (2nd occurrence)
column 18, line 61, change "425 $\mu$m." to --425 $\mu$m, and--.

Claim 3, column 19, line 10, change "acid.vinyl" to --acid•vinyl--;
column 19, lines 12 and 13, change "closslinked" to --crosslinked--;
column 19, line 13, change "crosslinkedpolymer" to --crosslinked polymer--;
column 19, line 14, change "acrylamide.acrylic" to --acrylamide•acrylic--;
column 19, line 15, change "acrylate.acrylic" to --acrylate•acrylic--; and
column 19, line 16, change "isobuylene.maleic" to --isobutylene•maleic--.

Claim 4, column 19, line 22, change "starch.polyarcylonitrile" to --starch•polyacrylonitrile--;
column 19, line 23, change "starch.acrylic" to --starch•acrylic--; and

UNITED STATES PATENT AND TRADEMARK OFFICE
CERTIFICATE OF CORRECTION

PATENT NO. : 5,350,617

DATED : September 27, 1994

INVENTOR(S) : Noriaki Fujisawa et al

It is certified that error appears in the above-indentified patent and that said Letters Patent is hereby corrected as shown below:

```
        column 19, line 24, change
"cellulose.polyacrylonitrile graft" to --cellulose·
polyacrylonitrile graft.--.
```

Signed and Sealed this

Eleventh Day of April, 1995

*Attest:*

BRUCE LEHMAN

*Attesting Officer*  *Commissioner of Patents and Trademarks*